United States Patent [19]
Varani

[11] 3,946,679
[45] Mar. 30, 1976

[54] METHOD AND APPARATUS FOR TREATING A CONTINUOUS FLOW OF FLUID WASTE PRODUCTS AND OTHER MATERIALS

[75] Inventor: Frederick T. Varani, Golden, Colo.
[73] Assignee: Adrian Const. Co., Dayton, Ohio
[22] Filed: Dec. 28, 1973
[21] Appl. No.: 429,096

[52] U.S. Cl. ................... 110/8 C; 110/7 R; 110/14; 210/71; 210/181; 210/512 R; 34/182
[51] Int. Cl.².. B01D 35/18; F23B 1/32; F23G 3/00; F26B 11/12
[58] Field of Search .......... 210/67, 68, 71, 180, 181, 210/183; 159/4 F; 110/7, 8 C, 8 R, 14; 432/14, 58, 105, 118; 34/182

[56] References Cited
UNITED STATES PATENTS

| | | | |
|---|---|---|---|
| 2,268,871 | 1/1942 | Hall | 159/4 F |
| 3,039,107 | 6/1962 | Bradford | 159/4 F |
| 3,805,714 | 4/1974 | Sharpe | 110/8 R |
| 3,827,158 | 8/1974 | Bradshaw et al. | 34/182 |

Primary Examiner—Frank A. Spear, Jr.
Assistant Examiner—Ferris H. Lander
Attorney, Agent, or Firm—Jacox & Meckstroth

[57] ABSTRACT

Moisture is removed from a fluid waste product or material by pumping the material axially through an elongated porous tube, forcing a gas generally radially inwardly through the tube to effect disintegration of the material, and then directing the material through a perforated duct which receives heated air from a burner unit. As the moisture evaporates from the material, the moisture vapor is separated from the dry solid particles by a separator connected to a suction blower for inducing a draft. The apparatus may also be adapted for treating or drying other materials such as slurries of metallurgical ores and for oxidizing or reducing mineral-type materials in addition to drying finely dispersed metal slurries in the production of powdered metals. Another embodiment of the apparatus is used for burning a fluid waste product or material.

10 Claims, 7 Drawing Figures

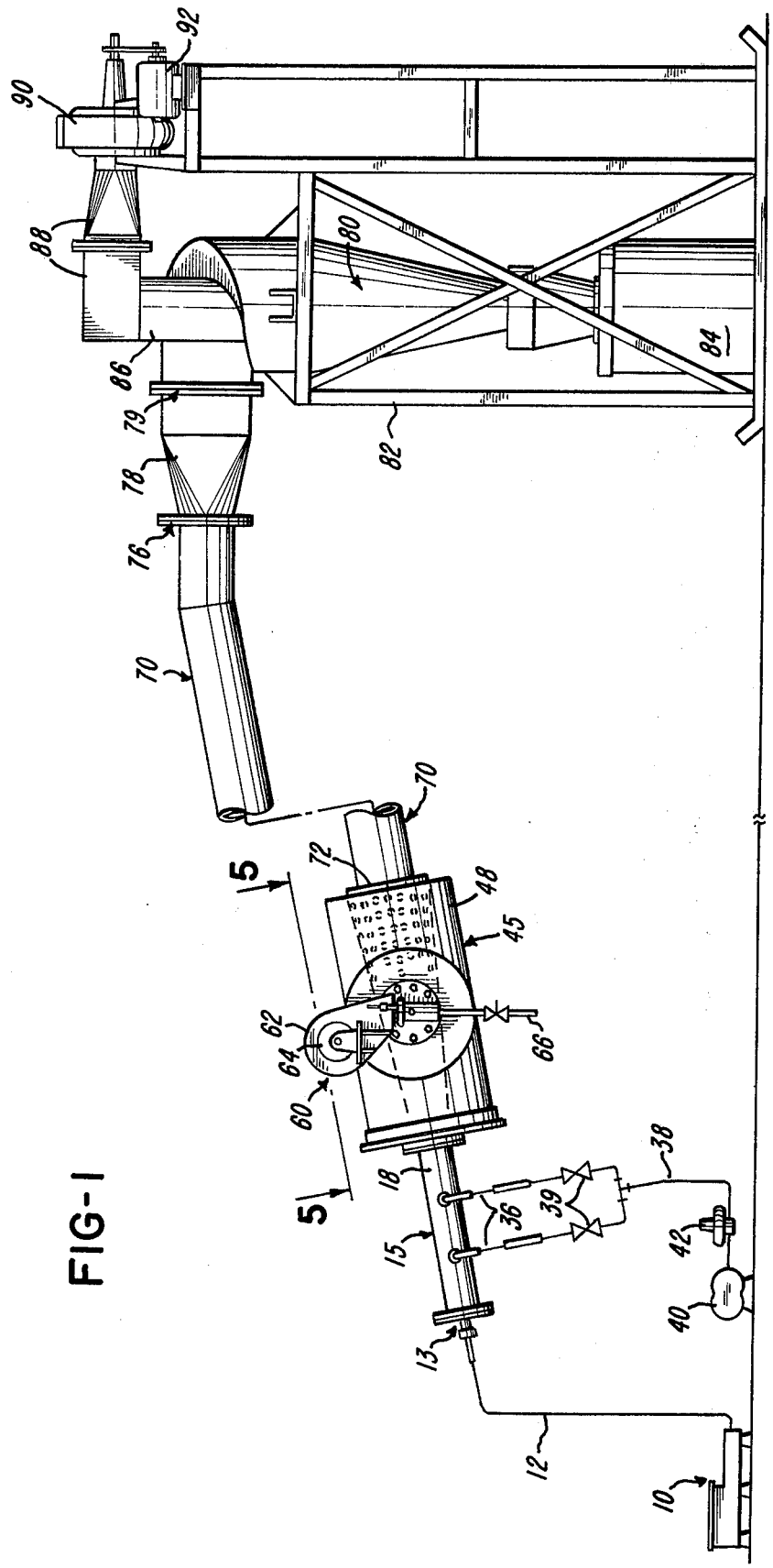

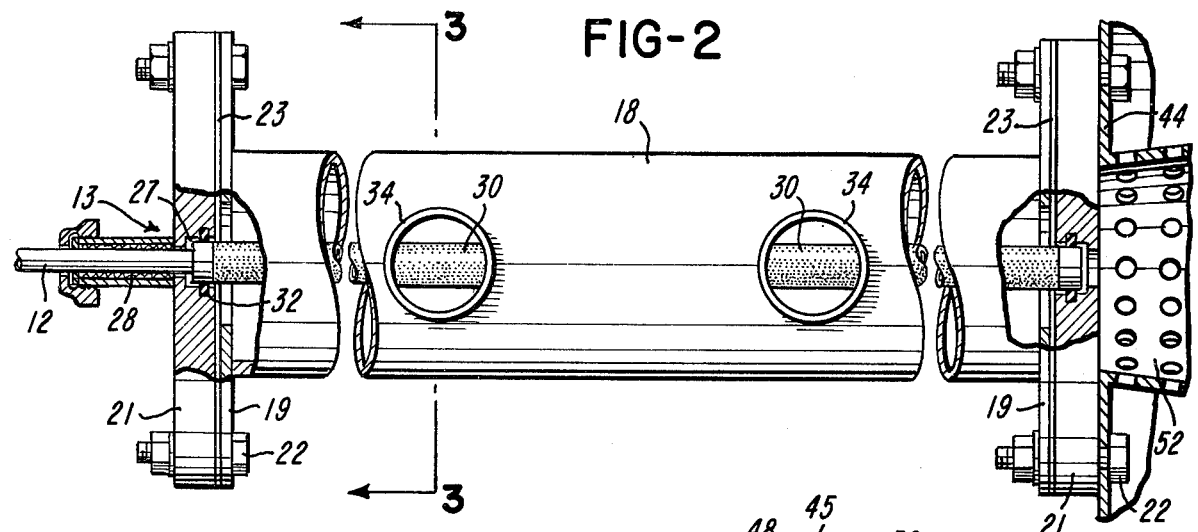
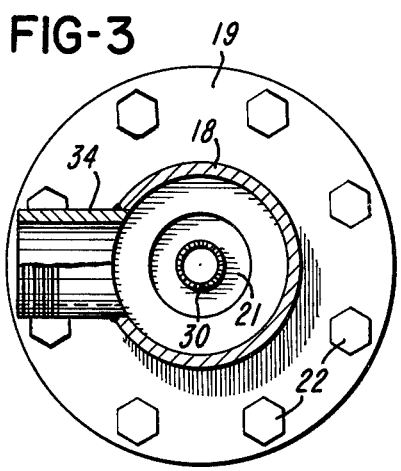
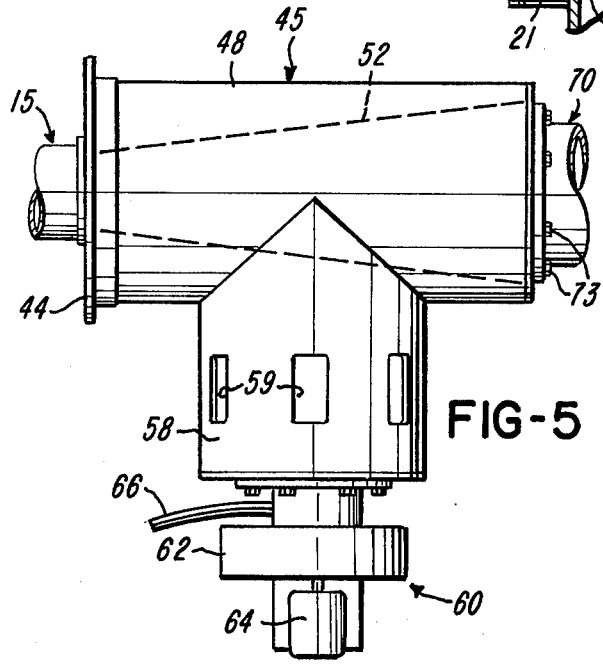
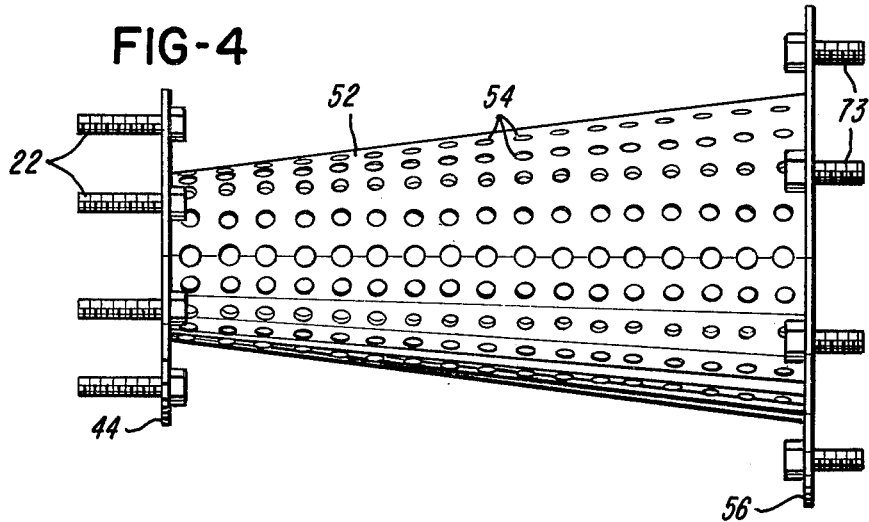

METHOD AND APPARATUS FOR TREATING A CONTINUOUS FLOW OF FLUID WASTE PRODUCTS AND OTHER MATERIALS

BACKGROUND OF THE INVENTION

There have been many systems either proposed or used for mechanically processing organic waste or sewage products such as a sewage sludge, and which include means for reducing the solids in the sludge and for drying the sludge. For example, U.S. Pat. Nos. 1,967,197, 3,272,740, 3,276,994, 3,397,140, 3,559,807, and 3,619,422 disclose various systems for mechanically processing and/or drying sewage sludge. U.S. Pat. No. 3,549,011 discloses another type of system for processing a slurry of waste or sewage and which utilizes a fluidized bed reactor for incinerating the solids within the slurry. An electrical resistance heating system is shown in U.S. Pat. No. 3,695,432 for burning a sewage sludge.

In any system designed for processing a continuous flow of sewage sludge or other waste product, it is desirable for the system to be simple in construction and dependable in operation so that maintenance of the system or equipment is minimized. In addition, it is desirable for the system to provide for effective and efficient processing or drying of the product with a minimum consumption of electrical energy and fuel for operating the equipment used in the system.

SUMMARY OF THE INVENTION

The present invention is directed to an improved method and apparatus for treating, drying or burning a continuous flow of material such as sewage sludge, and which is relatively simple and economical in construction and is capable of handling a large volume of material with the minimum of maintenance. The apparatus and method are illustrated and described in connection with the treatment and burning of sewage sludge. However, as will be apparent from the description which follows, the apparatus and method may also be used for treating various other materials.

In accordance with the illustrated embodiments of the invention, the sewage sludge or other waste material is directed into a positive displacement pump which forces the material axially through an elongated tube having a porous cylindrical wall defining minute pores or passages. The tube extends concentrically through a surrounding jacket into which a gas such as air is forced by a compressor. The gas flows generally radially through the tube and causes a breakdown or disintegration of the solids within the material and also produces acceleration of the material within the tube.

In one embodiment, the accelerated material is discharged from the porous tube into one end of a tapered perforated duct of a heater or burner unit. In the burner unit, the disintegrated material is exposed to air which is heated to a temperature substantially over 1,000° F. so that the moisture vaporizes from the material. As the water vapor escapes from the material, it is separated from the dry solid particles by a cyclone separator having a center vapor outlet duct connected to the inlet of a fan or blower. In another embodiment, the accelerated material is burned by additional air and a flame within the burner unit. The system has no moving parts except for the material supply pump, the gas compressor and the vapor suction blower which are commercially available components.

Other features and advantages of the invention will be apparent from the following description, the accompanying drawings and the appended claims.

BRIEF DESCRIPTION OF THE DRAWINGS

FIG. 1 is a diagrammatic elevational view of apparatus for treating a continuous flow of material and constructed in accordance with the present invention;

FIG. 2 is an enlarged elevational view, with portions broken away, of the material disintegrating unit shown in FIG. 1;

FIG. 3 is a radial section of the material disintegrating unit, taken generally on the line 3—3 of FIG. 2;

FIG. 4 is an enlarged view of a tapered perforated duct employed within the heater or burner unit shown in FIG. 1;

FIG. 5 is an enlarged plan view of the burner unit as taken generally on the line 5—5 of FIG. 1;

DESCRIPTION OF THE PREFERRED EMBODIMENTS

Figure 6:
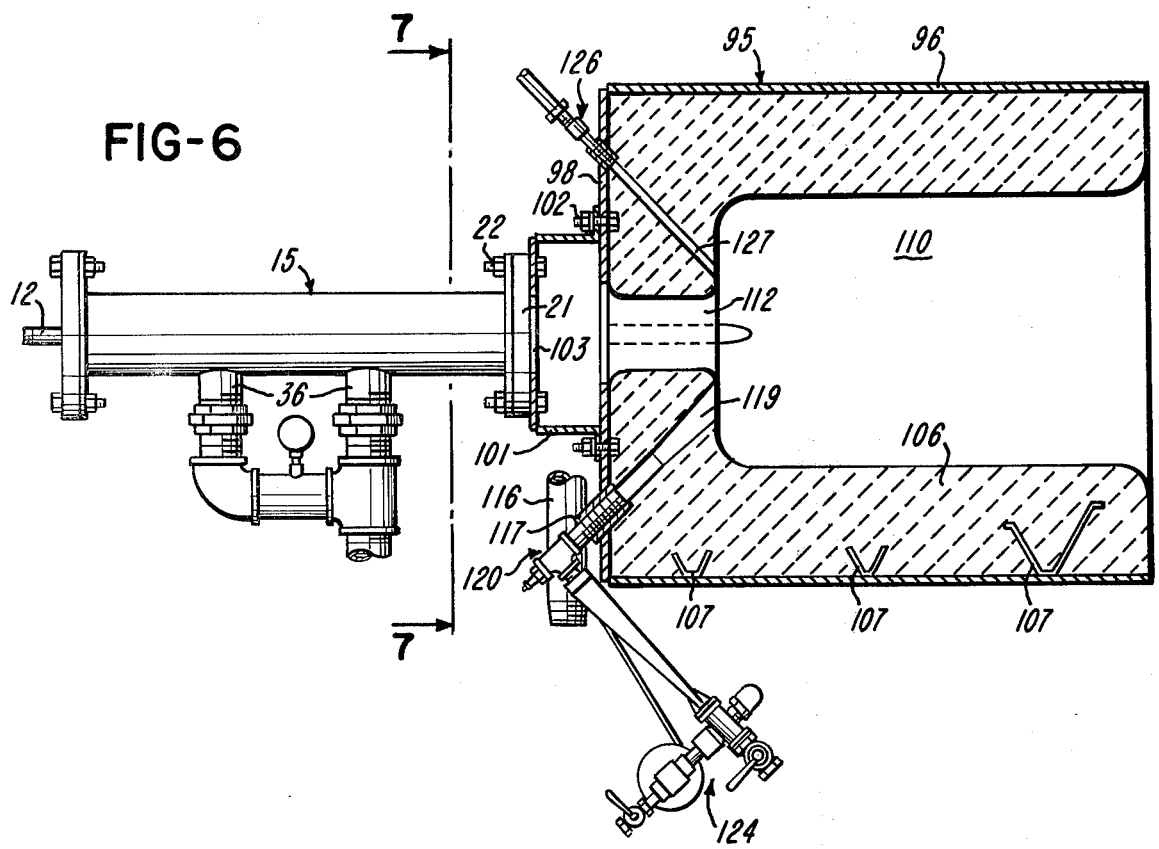
FIG. 6 is an elevation view, in part axial section of apparatus for treating and burning waste material in accordance with another embodiment of the invention.

Referring to FIG. 1, the material to be dried or treated, is fed into a positive displacement pump 10 such as a Moyno-type pump which incorporates a screw-like rotor within a housing having one or more internal helical flights. The material is pumped through a line 12 into the inlet end 13 of an elongated disintegrator unit 15. The disintegrator unit 15 includes a cylindrical outer shell or jacket 18 which extends between and rigidly connects parallel spaced annular end flanges 19 (FIG. 2). Each of the end flanges 19 is coupled to a corresponding heavier end plate 21 by a set of circumferentially spaced bolts 22, and a flat annular gasket 23 forms a fluid-tight seal between each of the end flanges 19 and corresponding end plate 21. The material supply pipe line 12 projects into a counterbored hole 27 (FIG. 2) formed within the end plate 21 at the inlet end 13 of the unit 15, and a fluid-tight seal is formed between the line 12 and plate 21 by a surrounding packing gland assembly 28.

An elongated porous tube 30 extends axially through the center of the jacket 18, and opposite end portions of the tube 30 project into the counterbored holes 27 within the corresponding end plates 21 where the end portions are sealed by corresponding O-rings 32. The porous tube 30 preferably has a uniform internal diameter and is preferably formed of a sintered stainless steel powder to define small passages or pores within the tube 30 along its length between the end plates 21. A strip of the sintered powder is rolled and welded into the shape of the tube 30. In one tested unit, the porous tube 30 had an inside diameter of ⅞ inch and an overall length of 24 inches. A generally similar porous tube within a surrounding jacket is disclosed in U.S. Pat. No. 3,193,991 for mixing fluid materials.

A set of gas inlet tubes 34 (FIGS. 2 and 3) projects radially outwardly from one side of the jacekt 18 and are connected by corresponding pipe lines or conduits 36 (FIG. 1) to a single gas supply line 38 through a pair of corresponding control valves 39. Compressed gas or air is supplied through the line 38 from an air or gas compressor 40, and a regulator 42 is connected in the line 38 to control the pressure and flow of gas or air supplied to the jacket 18 of the disintegrator unit 15. In one of the disintegrator units 18 which provide highly satisfactory results, air was supplied within a pressure range of between 10 p.s.i. and 50 p.s.i. and at a flow rate of approximately 75–100 C.F.M. A heater may also be installed in the air or gas supply system for heating the air or gas supplied into the jacket 18 around the porous disintegrator tube 30.

At the discharge end of the tube 30, the end plate 21 of the disintegrator unit 15 is secured to an annular end wall 44 (FIG. 2) of an elongated heater or burner unit 45. The unit 45 includes a cylindrical outer jacket or housing 48 which has an axis coextensive with the axis of the jacket 18 of the disintegrator unit 15. The housing 48 surrounds a concentrically positioned tapered or frusto-conical duct 52 (FIG. 4) which is provided with circumferentially spaced perforations or holes 54 along its entire length. In one tested unit, the holes had a diameter of ½ inch and were spaced at one inch on centers. The smaller end of the tapered duct 52 is rigidly secured to the end wall 44 of the housing 48, and the end wall 44 is secured to the adjacent end plate 21 of the unit 15 by the corresponding series of bolts 22. The opposite or larger end of the tapered duct 52 is rigidly secured to an annular flange 56 (FIG. 4) which forms the opposite end wall of the housing 48.

Referring to FIG. 5, the housing 48 of the heater or burner unit 45 includes an outwardly projecting cylindrical portion 58 which has a series of circumferentially spaced air inlet openings 59. A gas or oilfired burner assembly 60 is secured to the outer end wall of the tubular portion 58 of the housing 48 and includes an air blower 62 driven by an electric motor 64. Fuel in the form of oil or gas is supplied to the forced air burner assembly 60 through a fuel supply line 66.

An elongated evaporator tube 70 (FIG. 1) includes one end flange 72 which is connected to the discharge end of the burner unit 45 by a series of bolts 73 (FIG. 5). A flange coupling 76 (FIG. 1) connects the opposite end of the evaporator tube 70 to a duct 78 which encloses a butterfly-type damper member (not shown). The opposite end of the duct 78 is connected by a flange coupling 79 to the inlet of a cyclone separator 80 which is supported by a fabricated metal frame 82. The separator 80 is effective to separate centrifugally the vapor formed in the evaporator tube 70 from the dried solid particles which are discharged from the lower smaller end of the cyclone separator 80 into a container 84. The cyclone unit is insulated on its outer surface to prevent condensation of moisture vapor on its inner surface. The separated gas or vapor is exhausted from a center outlet duct 86 of the separator 80 which is connected by a duct 88 to the inlet of a centrifugal blower unit 90. The blower unit 90 is driven by an electric motor 92 also supported by the frame 82.

In the operation of the apparatus for treating or drying sewage sludge, the sludge is fed by the pump 10 through the line 12 and axially into the porous tube 30 within the disintegrator unit 15. As the sludge is flowing through the tube 30, compressed gas or air is supplied from the compressor 40 into the jacket 18 where the air is forced generally radially inwardly through the pores or small passages of the tube 30 and into the sludge flowing within the tube. The air is preferably maintained within a pressure range of 10 to 50 p.s.i. and effectively disintegrates the solids within the sludge into extremely fine particles. The additional supply of air within the disintegrator 15 and into the tube 30, is also effective to accelerate the flow of the disintegrated sludge and to blow the sludge into the smaller end of the tapered perforated duct 52 within the burner unit 45.

As the disintegrated sludge expands into the duct 52, air heated to a temperature of about 1300°F. by the burner assembly 60, is forced inwardly through the holes 54 within the duct 52. The hot air causes the moisture within the sludge to flash into an evaporated gaseous state within the evaporator tube 70 so that the solid particles are dried. As mentioned above, the evaporated moisture or vapor separates from the dried solid particles within the cyclone separator 80, and the dried solid particles are collected within the container 84. A low pressure suction is maintained on the vapor exhaust ducts 86 and 88 by the blower 90 to assist removal of the vapor from the dried solid particles which spiral downwardly into the container 84.

Referring to 6 and 7 which show another embodiment of the invention, the atomizer or disintegrator unit 15 is coupled directly to a burner unit 95 which includes a cylindrical shell 96 rigidly secured to a flat annular end wall 98 which is connected to a concentric cylindrical cup-shaped housing 101 by a series of bolts 102. The housing 101 is secured to the discharge end plate 21 of the disintegrator unit 15 by the corresponding bolts 22 and has a circular center opening 103 for receiving the material discharged from the porous tube 30 within the disintegrator unit 15. The outer casing or shell 96 and end wall 98 of the burner unit 95 are provided with a liner 106 of a refractory material which is secured to the shell 96 by a plurality of V-shaped anchor elements 107. The liner of refractory material 106 defines a generally cylindrical chamber 110 which extends from a substantially smaller cylindrical passage 112. Both the chamber 110 and passage 112 align axially with the porous tube 30 within the atomizer or disintegrator unit 15.

Figure 7:
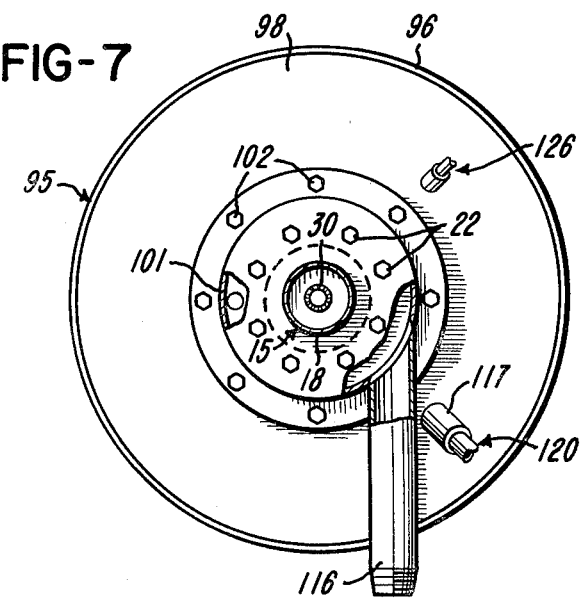
FIG. 7 is a radial section taken generally on the line 7—7 of FIG. 6, and with portions removed.

As shown in FIG. 7, an additional air supply tube or pipe 116 extends tangentially from the housing 101 of the burner unit 95 and is connected to an air supply pump or blower (not shown). A tubular coupling or fitting 117 extends through the end wall 98 on an axis which converges with and intersects the axis of the burner unit 95. The fitting 117 connects with a passage 119 formed within the rigid liner 106 of refractory material. An igniter unit 120 connects with the outer end of the fitting 117 and receives a supply of fuel or gas from a pilot operated gas valve unit 124. A flame detector unit 126 also extends angularly through the wall 98 of the burner unit 95 and is directed inwardly for sensing the igniter flame through an opening or passage 127 formed within the liner 106 of refractory material.

The embodiment shown in FIGS. 6 and 7 has been found to be highly effective for burning a relatively heavy fluid waste product or material such as the grease and scum which forms at the sewage treatment plant. After the waste material is disintegrated and atomized within the unit 15 by the compressed gas flowing inwardly through the porous tube 30, the accelerated material is discharged through the housing 101 and into the burner unit 95. The additional air supplied through the pipe 16, spirals inwardly to cause a cyclonic action of the accelerated and atomized waste material. When the spiraling material is exposed to the flame directed inwardly through the passage 119 from the igniter unit 120, the waste material burns with substantially complete combustion within the chamber 110 of the burner unit 95. In the event the flame goes out, the flame detector 126 stops the material supply pump 10 so that the atomized waste material does not accumulate within the burner chamber 110.

From the drawings and the above description, it is apparent that the apparatus constructed and arranged in accordance with the present invention, provide desirable features and advantages. For example, the apparatus is adapted to handle a high volume continuous flow of a waste material such as sewage sludge and is highly effective in removing moisture from the material or burning the material without requiring the use of a power driven mixer for agitating or stirring the material. In addition, the apparatus is basically simple in construction and effectively reduces or disintegrates flowable materials or products such as sewage sludge, contaminated oils and greases and the scum which develops from a sewage system, and expands the products with air or gas so that they may be quickly dried. That is, the introduction of the compressed air or gas generally radially into the material flowing through the porous tube 30, is extremely effective to disintegrate and atomize the solids within the material into uniformly dispersed fine particles so that a substantially larger surface area of the material is exposed for contact by the hot air or gas injected into the disintegrated material within the burner unit 45 or the flame within the burner unit 95.

As mentioned above, the process and apparatus of the invention also have applications for treating other flowable materials in addition to the drying of waste products as described above. For example, the apparatus may be used for drying slurries of metallurgical ores and especially those which are very fine mesh materials such as copper ores, molybdenum sulfides, and uranium oxides and which are difficult to dry. The apparatus may also be used for roating or reducing or oxidizing other flowable materials which are capable of being pumped or forced through the disintegrator tube 30. In addition, the apparatus and method have application in the manufacturing and production of powdered metals particularly in reducing a molten metal into a finely divided powdered state and for drying the quenched powdered material.

While the methods and forms of apparatus herein described constitute preferred embodiments of the invention, it is to be understood that the invention is not limited to the precise methods and forms of apparatus described, and that changes may be made therein without departing from the scope and spirit of the invention as defined in the appended claims.

The invention having thus been described, the following is claimed:

1. A method of drying or burning a continuous flow of organic waste material, comprising the steps of pumping the material through an elongated rigid porous tube, forcing a gas generally radially inwardly through the pores of the tube and into the material flowing through the tube to create substantial turbulence within the material for disintegrating the material into fine particles and to accelerate the flow of particles within the tube, discharging and expanding the accelerated particles from the tube into a heating chamber, directing a flame into the material, and introducing air into the disintegrated material after it is discharged from said tube and prior to directing the flame into the material.

2. Apparatus for disintegrating and drying or burning a continuous flow of semi-solid material, comprising an elongated tube having an inlet end portion and an outlet end portion, means defining fine passages within said tube along the length thereof between said inlet and outlet end portions, means for pumping the material into said inlet end portion with sufficient pressure to produce an axial flow of material through said tube, a housing defining a pressure chamber around said tube, compressor means for injecting a gas into said pressure chamber and inwardly through said passages into the material flowing axially through said tube, said compressor means being effective to inject the gas into the material with sufficient pressure to produce substantial turbulence and disintegration of the semi-solid material within said tube into fine particles and to accelerate the flow of the particles, said compressor means and said housing and said tube cooperating to discharge the fine particles and gas through said outlet end portion of said tube in the form of a mixture, means defining a heating chamber connected to said outlet end portion of said tube for receiving the discharged mixture of gas and fine particles, and heater means for heating the mixture of gas and fine particles within said heating chamber.

3. Apparatus as defined in claim 2 including means disposed between said outlet end portion of said tube and said heating chamber for directing additional air into the disintegrated material.

4. Apparatus for disintegrating and drying or burning a continuous flow of semi-solid material, comprising an elongated tube having an inlet end portion and an outlet end portion, said tube being formed of a rigid porous metal defining fine pores within said tube along the length thereof between said inlet and outlet end portions, means for pumping the material into said inlet end portion with sufficient pressure to produce an axial flow of material through said tube, a housing defining a pressure chamber around said tube, compressor means for injecting a gas into said pressure chamber and inwardly through said pores into the material flowing axially through said tube, said compressor means being effective to inject the gas into the material with sufficient pressure to produce substantial turbulence and disintegration of the semi-solid material within said tube into fine particles and to accelerate the flow of the particles, said compressor means and said housing and said tube cooperating to discharge the fine particles and gas through said outlet end portion of said tube in the form of a mixture, means defining a heating chamber connected to said outlet end portion of said tube for receiving the discharged mixture of gas and fine particles, and heater means for heating the mixture of gas and fine particles within said heating chamber.

5. Apparatus as defined in claim 4 wherein said tube comprises sintered powder metal.

6. Apparatus for disintegrating and burning a continuous flow of semi-solid material, comprising an elongated tube having an inlet end portion and an outlet end portion, means defining fine passages within said tube along the length thereof between said inlet and outlet end portions, means for pumping the material into said inlet end portion with sufficient pressure to produce an axial flow of material through said tube, a housing defining a pressure chamber around said tube, compressor means for injecting a gas into said pressure chamber and inwardly through said passages into the material flowing axially through said tube, said compressor means being effective to inject the gas into the material with sufficient pressure to produce substantial turbulence and disintegration of the semi-solid material within said tube into fine particles and to accelerate the flow of the particles, said compressor means and said housing and said tube cooperating to discharge the fine particles and gas through said outlet end portion of said tube in the form of a mixture, means defining a burning chamber connected to said outlet end portion of said tube for receiving the discharged mixture of gas and fine particles, a fuel burning unit for directing a flame into the mixture of gas and fine particles within said burning chamber.

7. Apparatus as defined in claim 6 including means disposed between said outlet end portion of said tube and said burning chamber for directing air into the discharged mixture.

8. A method of disintegrating and drying or burning a continuous flow of semi-solid material, comprising the steps of pumping the material into the inlet end portion of an elongated tube defining fine passages along the length thereof and with sufficient pressure to produce an axial flow of material through said tube, forcing a gas inwardly through said passages and into the material flowing axially through said tube, the pressure of the gas being sufficient to produce substantial turbulence and disintegration of the semi-solid material within said tube into fine particles and to accelerate the flow of the fine particles with the gas in the form of a mixture, discharging the mixture of fine particles and gas through an outlet end portion of said tube and into a heating chamber, and heating the mixture of gas and fine particles within said heating chamber for substantially increasing the temperature of the mixture.

9. A method as defined in claim 8, including the step of introducing air into the mixture after it is discharged from said tube and prior to directing the flame into the material.

10. A method of disintegrating and burning a continuous flow of semi-solid material, comprising the steps of pumping the material into the inlet end portion of an elongated tube defining fine passages along the length thereof and with sufficient pressure to produce an axial flow of material through said tube, forcing a gas inwardly through said passages and into the material flowing axially through said tube, the pressure of the gas being sufficient to produce substantial turbulence and disintegration of the semi-solid material within said tube into fine particles and to accelerate the flow of the fine particles with the gas in the form of a mixture, discharging the mixture of fine particles and gas through an outlet end portion of said tube and into a burning chamber, and directing a flame into the mixture of gas and fine particles within said burning chamber to effect burning of the mixture.

* * * * *